United States Patent
Abdelsamed et al.

(10) Patent No.: US 11,445,056 B1
(45) Date of Patent: *Sep. 13, 2022

(54) TELEPHONE SYSTEM FOR THE HEARING IMPAIRED

(71) Applicant: Eugenious Enterprises, LLC, Medina, OH (US)

(72) Inventors: Daniel Yusef Abdelsamed, Granville, OH (US); Michael J. Medley, Medina, OH (US); Matthew G. Good, Eldersburg, MD (US)

(73) Assignee: EUGENIOUS ENTERPRISES, LLC, Medina, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/988,642

(22) Filed: Aug. 8, 2020

Related U.S. Application Data

(63) Continuation-in-part of application No. 16/812,293, filed on Mar. 7, 2020.

(51) Int. Cl.
| | |
|---|---|
| H04M 1/72478 | (2021.01) |
| H04M 3/42 | (2006.01) |
| H04M 1/247 | (2021.01) |
| G10L 15/22 | (2006.01) |
| G10L 15/26 | (2006.01) |
| G10L 21/10 | (2013.01) |
| H04M 7/00 | (2006.01) |
| H04L 67/10 | (2022.01) |
| G10L 15/30 | (2013.01) |
| G10L 21/06 | (2013.01) |

(52) U.S. Cl.
CPC .......... *H04M 1/2475* (2013.01); *G10L 15/22* (2013.01); *G10L 15/26* (2013.01); *G10L 15/30* (2013.01); *G10L 21/10* (2013.01); *H04L 67/10* (2013.01); *H04M 3/42391* (2013.01); *H04M 7/006* (2013.01); *G10L 2021/065* (2013.01)

(58) Field of Classification Search
None
See application file for complete search history.

(56) References Cited

U.S. PATENT DOCUMENTS

| | | | |
|---|---|---|---|
| 9,628,620 B1 | 4/2017 | Rae et al. | |
| 10,122,968 B1 | 11/2018 | Talbot | |
| 10,192,554 B1 | 1/2019 | Boehme et al. | |
| 2002/0161578 A1* | 10/2002 | Saindon | G10L 15/26 704/235 |
| 2014/0018045 A1* | 1/2014 | Tucker | H04W 4/12 455/413 |

(Continued)

OTHER PUBLICATIONS

"Captioned Telephone Service (CTS)", Retrieved from: <<https://www.nad.org/resources/technology/telephone-and-relay-services/captioned-telephone-service-cts/>>, Retrieved Date: Mar. 6, 2020, 2 Pages.

(Continued)

*Primary Examiner* — Quoc D Tran
(74) *Attorney, Agent, or Firm* — Michael J. Medley

(57) ABSTRACT

Technologies related to telecommunications are described herein, wherein such technologies are configured to assist users with hearing impairments. The technologies described herein cause transcriptions of spoken utterances directed to a telephone in a telephone conversation to be presented on a display of the telephone nearly simultaneously with the spoken utterances being audibly output by the telephone.

20 Claims, 5 Drawing Sheets

(56) References Cited

U.S. PATENT DOCUMENTS

2017/0085506 A1* 3/2017 Gordon ................. H04L 51/046
2019/0378533 A1* 12/2019 Chao ....................... G10L 13/00
2020/0153958 A1* 5/2020 Engelke ................. G10L 15/26

OTHER PUBLICATIONS

"Harris Communications", Retrieved from: <<https://www.harriscomm.com/captel-2400i-captioned-phone.html>>, Retrieved Date: Mar. 6, 2020, 4 Pages.

"Internet Protocol (IP) Captioned Telephone Service", Retrieved from: <<https://www.fcc.gov/consumers/guides/internet-protocol-ip-captioned-telephone-service>> Retrieved Date: Mar. 6, 2020, 2 Pages.

"Non-Final Office Action for U.S. Appl. No. 16/812,293", dated Jul. 13, 2020, 7 Pages.

* cited by examiner

TELEPHONE SYSTEM FOR THE HEARING IMPAIRED

RELATED APPLICATION

This application is a continuation-in-part of U.S. patent application Ser. No. 16/812,293, filed on Mar. 7, 2020, and entitled "TELEPHONE SYSTEM FOR THE HEARING IMPAIRED", the entirety of which is incorporated herein by reference.

BACKGROUND

Hearing loss affects approximately ⅓ of people between the ages of 61 and 70 and affects approximately 4/5 of people over the age of 85. Hearing aids are often used by people with hearing loss; hearing aids, generally, are configured to amplify audio that is detected by the hearing aids. As hearing loss continues for people as they age, hearing aids become less effective.

Accordingly, as a person ages and continues to experience hearing loss, an ability of the person to communicate audibly with other people is deleteriously impacted. For example, a person with a hearing impairment is unable to effectively use a conventional telephone system, as the person (regardless of whether or not the person is using hearing aids) is unable to hear the voice of a second person with whom the person is attempting to communicate via the telephone system.

Captioned telephones have been developed to assist people with hearing loss when using a telephone. Captioned telephones are provided to people who have been certified by a hearing expert as experiencing hearing loss, wherein in the United States a federally funded captioning service is employed to provide captions to a user of a captioned telephone. In more detail, when a person using a captioned telephone places or receives a call, the captioned telephone establishes a three-way communication session between the captioned telephone, a telephone used by a contact of the person, and a telephone system used by an operator associated with the captioning service. The operator associated with the captioning service then causes a transcription of a conversation between the person and the contact of the person to be transmitted to the captioned telephone, whereupon the captioned telephone displays the transcription on a display.

There are several deficiencies associated with conventional captioned telephone systems. For example, to obtain a captioned telephone, a person must meet with a hearing specialist and register with the federally funded captioning service. In addition, when a captioned telephone is employed, a human operator listens to conversations undertaken between the person using the captioned telephone and contacts of the person, which may feel invasive to the people in the conversation. In addition, since there is a third party listening to the conversation, it may be difficult for the person and the contact of the person to exchange private information. Still further, there is delay associated with captioned telephones; the user of the captioned telephone may hear audio well before a transcription of the audio is presented, potentially leading to confusion.

SUMMARY

The following is a brief summary of subject matter that is described in greater detail herein. This summary is not intended to be limiting as to the scope of the claims.

Described herein are various technologies pertaining to systems and methodologies for assisting people with hearing impairments. The technologies described herein are configured to cause transcriptions of spoken utterances to be presented on a display of a telephone system employed by a hearing-impaired user to conduct telephone conversations. An exemplary system described herein includes a first telephone operated by a first user (with a hearing impairment) and a second telephone operated by a second user. The first telephone and the second telephone can be in a telephone call session, such that a first voice signal output by the first telephone system is transmitted to the second telephone and a second voice signal output by the second telephone is transmitted to the first telephone (such that bidirectional verbal communication occurs between the first user of the first telephone and the second user of the second telephone).

The system further includes a network-accessible communications platform, wherein the first telephone is registered with the communications platform. The communications platform is configured to connect and maintain calls between the first telephone and other telephones that are called from the first telephone or are making calls to the first telephone.

The system additionally includes a server computing system, wherein the first telephone is registered with the server computing system. Further, the communications platform comprises or has access to data that indicates that the first telephone is registered with the server computing system. For example, the communications platform, upon receiving a request from the first telephone to initiate a call session with the second telephone, can transmit an outbound call notification to the server computing system and can refrain from initiating the call session until instructions are received from the server computing system. The server computing system, upon receiving such outbound call notification, can instruct the communications platform to initiate the call session between the first telephone and the second telephone. Additionally, the server computing system can instruct the communications platform to cause the second voice signal (output by the second telephone) to additionally be streamed to the server computing system. Hence, the server computing system receives the second voice signal, which includes spoken utterances of the second user that are directed to the first user.

The system further includes a transcription computing system that is in network communication with the server computing system. The transcription computing system is configured to generate and output transcriptions of spoken utterances in voice signals received from the server computing system in real-time or near real-time (e.g., the transcription computing system can output a transcription of a word within 0.5 seconds of receiving the word in a voice signal). Hence, when the server computing system receives the second voice signal output by the second telephone, the server computing system forwards the second voice signal to the transcription computing system. The transcription computing system generates transcriptions of spoken utterances in the second voice signal and outputs the transcriptions of the spoken utterances to the server computing system.

Upon receipt of the transcriptions of the spoken utterances in the second voice signal, the server computing system transmits the transcriptions of the spoken utterances to the first telephone, and the first telephone displays the transcriptions of the spoken utterances immediately upon receipt thereof. Thus, the first telephone displays the transcriptions of the spoken utterances nearly simultaneously with the spoken utterances being audibly output by a speaker of the first telephone. It can be ascertained that the first user can read the transcriptions nearly simultaneously with the spoken utterances being audibly output by the speaker of the first telephone.

The technologies described above exhibit various advantages over the conventional captioned telephone system. Specifically, the technologies described above do not require the user of the first telephone to register with a governmental agency to receive transcriptions of spoken utterances. Moreover, the bidirectional call is not routed to a human listener who is tasked with listening to conversations and transcribing spoken utterances in the conversations. Finally, the technologies described herein allow for transcriptions of spoken utterances to be displayed nearly simultaneously with the spoken utterances being audibly output to a user, thereby improving communications between the user and another user with whom the user is speaking.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
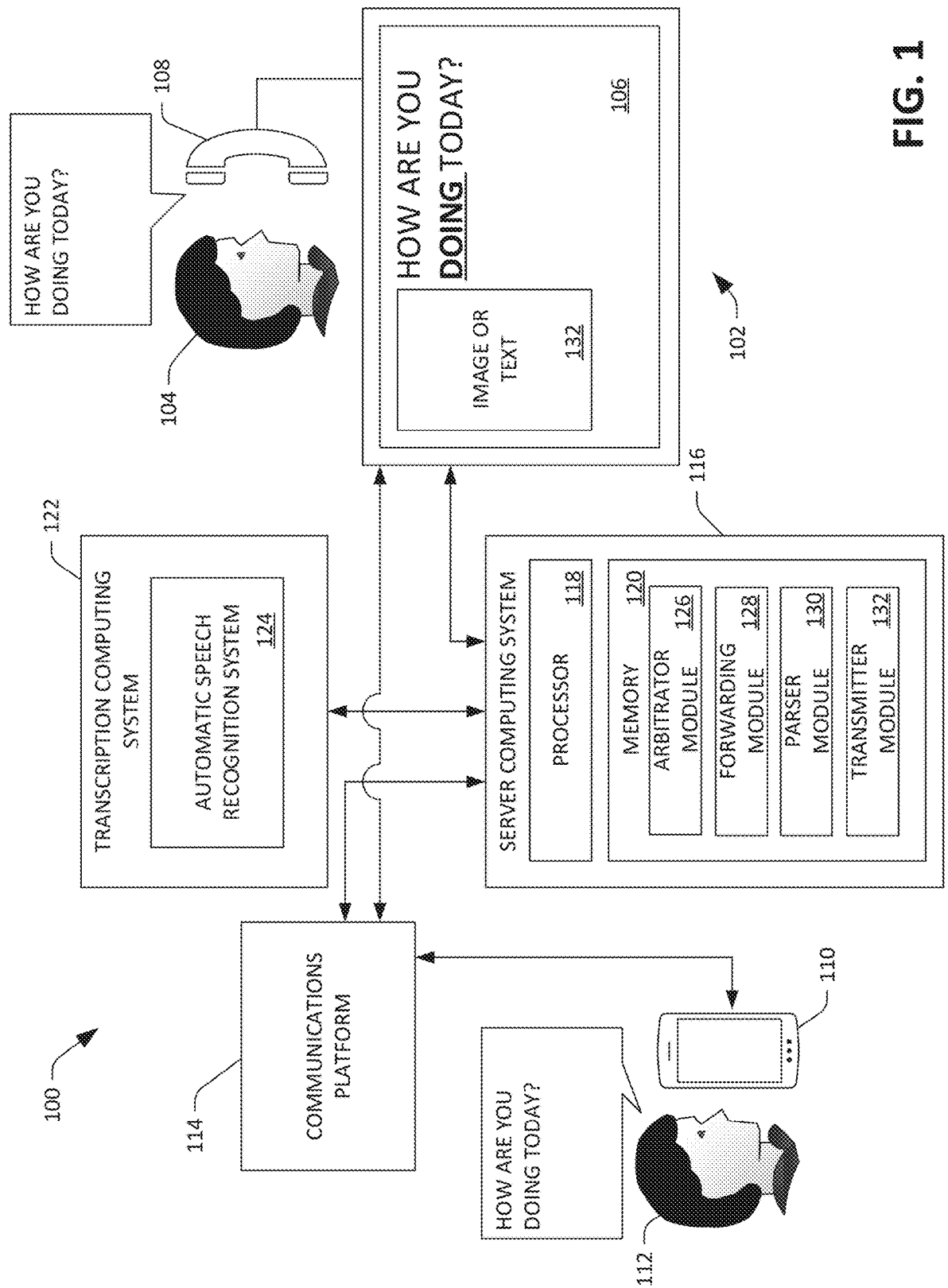
FIG. 1 is a functional block diagram of an exemplary system that is configured to cause transcriptions of spoken utterances in a telephone call session to be presented on a display of a telephone nearly simultaneously with the spoken utterances being audibly output by the telephone.

Various technologies pertaining to assisting people with hearing impairments with participating in both telephone conversations are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components.

Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices. Further, as used herein, the term "exemplary" is intended to mean serving as an illustration or example of something and is not intended to indicate a preference.

Described herein are various technologies pertaining to presentment of transcriptions of spoken utterances in a telephone conversation on a display of a telephone nearly simultaneously with the spoken utterances being output by a speaker of the telephone. The technologies described herein are particularly advantageous for use by a person with a hearing impairment, such as an elderly person living in an assisted living facility or nursing home. A telephone can have a relatively large display, such as on the order of approximately 10 inches diagonally. When a user of such telephone is participating in a telephone conversation with a second user, spoken utterances of the second user are directed to a speaker of the telephone (e.g., in a handset of the telephone) while nearly simultaneously transcriptions of the spoken utterances are presented on the display of the telephone. Hence, the user with the hearing impairment is audibly provided with the spoken utterances and at nearly the same time is visually provided with transcriptions of the spoken utterances. In addition, the second user need not have any special equipment to participate in a telephone conversation with the hearing-impaired user. Moreover, the technologies described herein do not require that a third user listen to the telephone conversation between the user and the second user in order to provide transcriptions to the hearing-impaired user.

With reference now to FIG. 1, an exemplary system 100 that facilitates assisting a first user (who may have a hearing impairment) with participating in a telephone call is illustrated. The system 100 includes a first telephone 102 operated by a first user 104, wherein the first user 104 has a hearing impairment and/or is an environment where it is difficult for the first user 104 to hear (e.g., a noisy restaurant, on a factory floor, etc.). For example, the first user 104 may be an elderly person who is residing in an assisted living facility or nursing home. The first telephone 102 comprises a display 106 that, for example, can have a relatively large screen (for a telephone), such as on the order of a 10-inch diagonal screen. It is to be understood that other screen sizes are contemplated. The relatively large screen is advantageous with respect to presentment of text on the display 106, as at least one sentence of text can be presented in relatively large font (e.g., 16-point font). The first telephone 102 further includes a handset 108, wherein the handset 108 includes a speaker (not shown) and a microphone (not shown). The speaker of the handset 108 is proximate the ear of the first user 104 when the first user 104 is participating in a telephone call, and the microphone is proximate the mouth of the first user 104 when the first user 104 is participating in a telephone call.

The system 100 further comprises a second telephone 110 that is operated by a second user 112. The second telephone 110 can be any suitable type of telephone, such as a smart phone, a landline phone, etc. In another example, the second telephone 110 may be a computing system, such as a laptop computing device, a tablet computing device, a wearable computing device, a smart speaker, etc.

The system 100 additionally includes a network-accessible communications platform 114 that is configured to establish and maintain call sessions between devices (e.g., between telephones). The communications platform 114 is a cloud platform that supports Internet-based voice and data communications and hosts telecommunications applications, switching, and storage for clients of such platform 114. An exemplary communications platform is Twilio®, although the communications platform 114 can be any suitable communications platform. Further, in an exemplary embodiment, the communications platform 114 may provide telecommunications services that conform to the Voice over Internet Protocol (VoIP), although other voice technologies are contemplated.

The system 100 further includes a server computing system 116 that is in communication with the first telephone 102 and the communications platform 114. The server computing system 116 includes a processor 118 and memory 120, wherein the memory 120 includes instructions that are executed by the processor 118. These instructions are described in greater detail below. The system 100 further comprises a transcription computing system 122 that is in network communication with the server computing system 116. The transcription computing system 122 executes an automatic speech recognition (ASR) system 124, wherein the ASR system 124 is configured to receive a voice signal from the server computing system 116, wherein the voice signal comprises spoken utterances. The ASR system 124 is further configured to generate transcriptions of the spoken utterances and return such transcriptions to the server computing system 116. The ASR system 124 can be a real-time transcription system, in that the ASR system 124 generates transcriptions of spoken utterances in real-time or near real-time upon receipt of a voice signal that include such spoken utterances.

Returning to the server computing system 116, the memory 120 includes an arbitrator module 126, a forwarding module 128, a parser module 130, and a transmitter module 132, wherein such modules 126-132 can be executed by the processor 118 and will be described in turn. The arbitrator module 126 is configured to provide instructions to the communications platform 114 with respect to providing the first telephone 102 with access to communications services provided by the communications platform 114. In an example, when the first telephone 102 requests a token that the first telephone 102 can provide to the communications platform 114 to access telecommunication services provided by the communications platform, the first telephone 102 transmits such request to the server computing system 116, whereupon the request is provided to the arbitrator module 126. The arbitrator module 126, in an example, can assign a telephone number to the first telephone 102 and can transmit a request for a token to the communications platform 114, wherein the request for the token comprises the telephone number for the first telephone 102 and account credentials of the server computing system 116 (e.g., an account key). The communications platform 114 generates the token based upon the account credentials of the server computing system 116 and can optionally assign a unique device identifier to the first telephone 102. The communications platform 114 can then transmit the token and the unique device identifier to the server computing system 116, and the arbitrator module 126 can transmit the token to the first telephone 102. In addition, the arbitrator module 126 can optionally map the telephone number of the first telephone 102 to the device identifier for the first telephone 102.

Further, as will be described in greater detail below, when the communications platform 114 receives a request from the second telephone 110 to initiate a call session with the first telephone (e.g., when the communications platform 114 receives an indication that the second telephone 110 is being used to call the first telephone 102), the communications platform 114 can transmit an incoming call notification to the server computing system 116, wherein the incoming call notification can include the unique device identifier for the first telephone 102. The arbitrator module 126 receives such incoming call notification and, in response to receipt thereof, instructs the communications platform 114 to connect the call (to initiate and maintain a call session between the second telephone 110 and the first telephone). Similarly, when the communications platform 114 receives an indication that the first telephone 102 is being employed to place a call to the second telephone 110, the communications platform 114 can transmit an outbound call notification to the server computing system 116. The arbitrator module 126 is provided with the outbound call notification (which includes the unique identifier for the first telephone 102), and in response to receipt of the notification the arbitrator module 126 instructs the communications platform 114 to initiate the call (e.g., cause the second telephone 110 to ring).

In addition, the arbitrator module 126, upon receipt of either an inbound call notification or an outbound call notification, can instruct the communications platform 114 to stream the voice signal output by the second telephone 110 to the server computing system 116. Therefore, in addition to the voice signal output by the second telephone 110 being provided to the first telephone 102, the voice signal is transmitted to the server computing system 116.

The forwarding module 128 is configured to forward such voice signal to the transcription computing system 122, whereupon the voice signal is provided to the ASR system 124. The ASR system 124 generates data based upon the voice signal, wherein the data includes transcriptions of spoken utterances in the voice signal and metadata that corresponds to such transcriptions. The metadata can comprise timestamps assigned to words in the transcriptions, labels assigned to words in the transcriptions (such as whether or not the ASR system 124 may update a transcription of a word), etc. As indicated previously, the ASR system 124 generates the transcriptions of the spoken utterances in real-time or near real-time.

The parser module 130 receives the data output by the ASR system 124 and filters the aforementioned metadata from such data, leaving only the transcriptions of the spoken utterances. The transmitter module 132 transmits the transcriptions to the first telephone 102, whereupon the first telephone 102 displays the transcriptions of the spoken utterances on the display 106. The first telephone additionally receives the voice signal output by the second telephone 110 and audibly outputs the spoken utterances by way of the speaker of the handset 108. The first telephone 102 displays the transcriptions proximate in time to when the spoken utterances are audibly output to the first user 104 by the first telephone 102, In the example illustrated in FIG. 1, the second user 112 sets forth the spoken utterance "how are you doing today" to a microphone of the second telephone 110 during a call session between the second telephone 110 and the first telephone. The telephone 110 generates a voice signal that includes the spoken utterance and such voice signal is transmitted to the first telephone 102 at least partially by way of the communications platform 114.

Further, the voice signal is streamed to the server computing system 116, which forwards the voice signal to the transcription computing system 122. The ASR system 124 transcribes the spoken utterances "how are you doing today" and transmits the transcriptions of such spoken utterances (along with additional metadata) to the server computing system 116. The server computing system 116 then transmits the spoken utterances to the first telephone 102, which displays the spoken utterances on the display 106. In addition to presenting the spoken utterances on the display 106, the first telephone 102 can be configured to cause other graphical data 132 to be presented on the display 106, wherein the other graphical data 132 can include an image that identifies the second user 112 and/or text that sets forth the name of the second user 112. Still further, in an exemplary embodiment, the first telephone 102 can be configured to highlight words presented on the display 106 as such words are audibly output by way of the speaker of the handset 108. In the example shown in FIG. 1, the word "doing" is highlighted simultaneously or near simultaneously with the word "doing" being audibly output by way of the handset 108.

Figure 2:
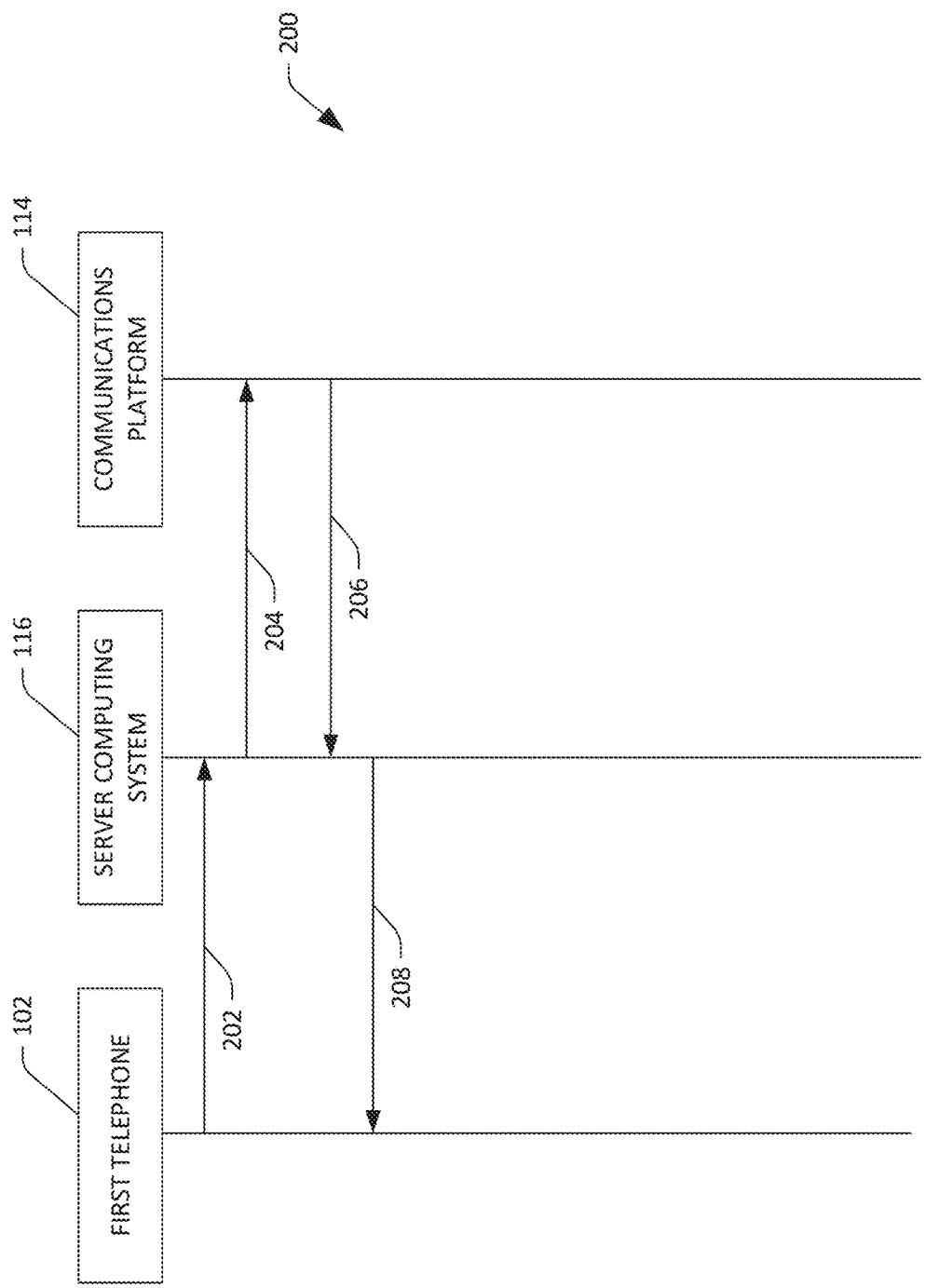
FIG. 2 is a communications diagram that illustrates communications undertaken between a first telephone, a server computing system, and a telephone computing system when the first telephone is registering with the telephone computing system.
Figure 3:
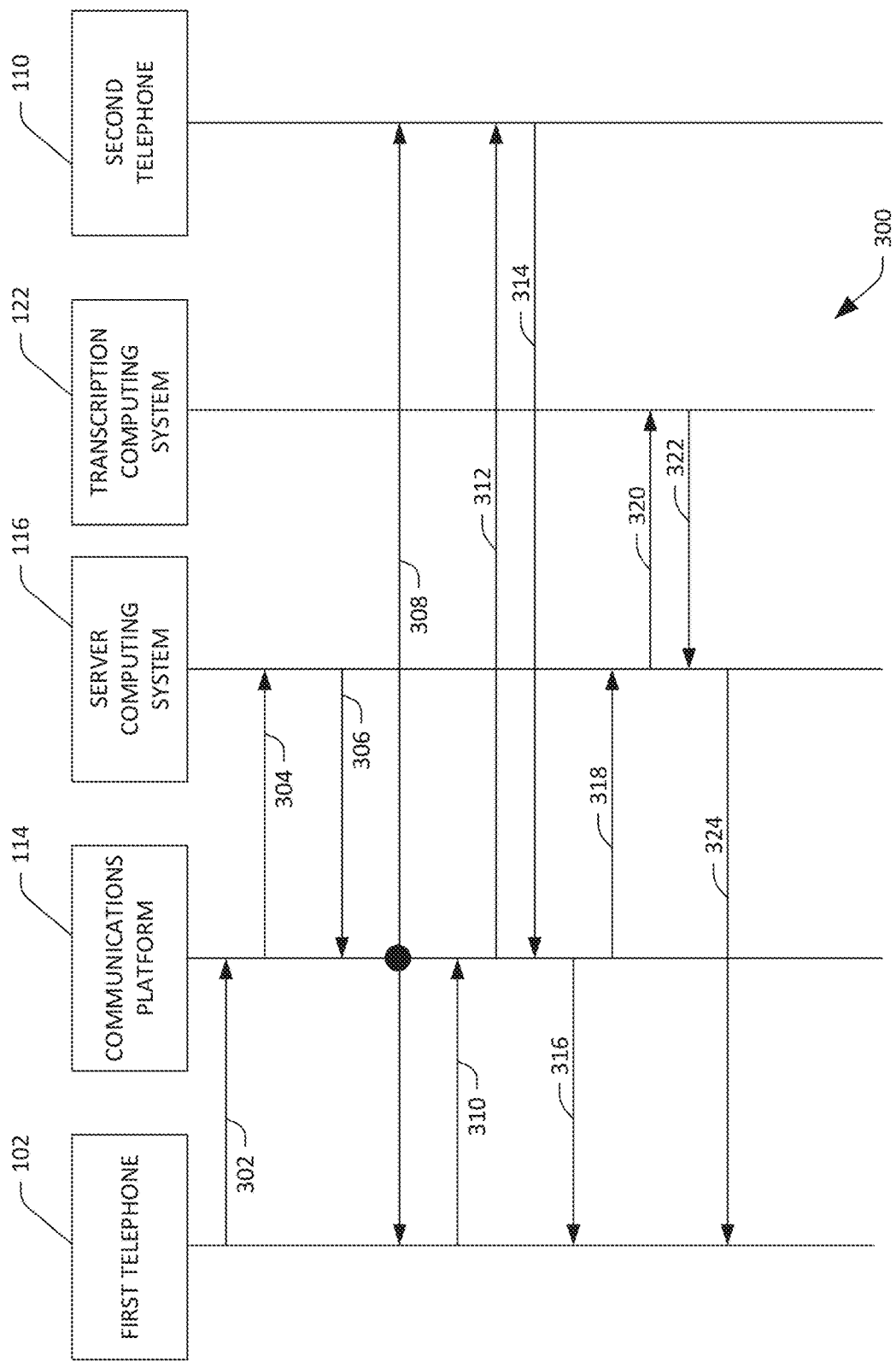
FIG. 3 is a communications diagram that illustrates exemplary communications between a first telephone, a second telephone, a communications platform, a server computing system, and a transcription computing system when a call is placed from the first telephone to the second telephone.
Figure 4:
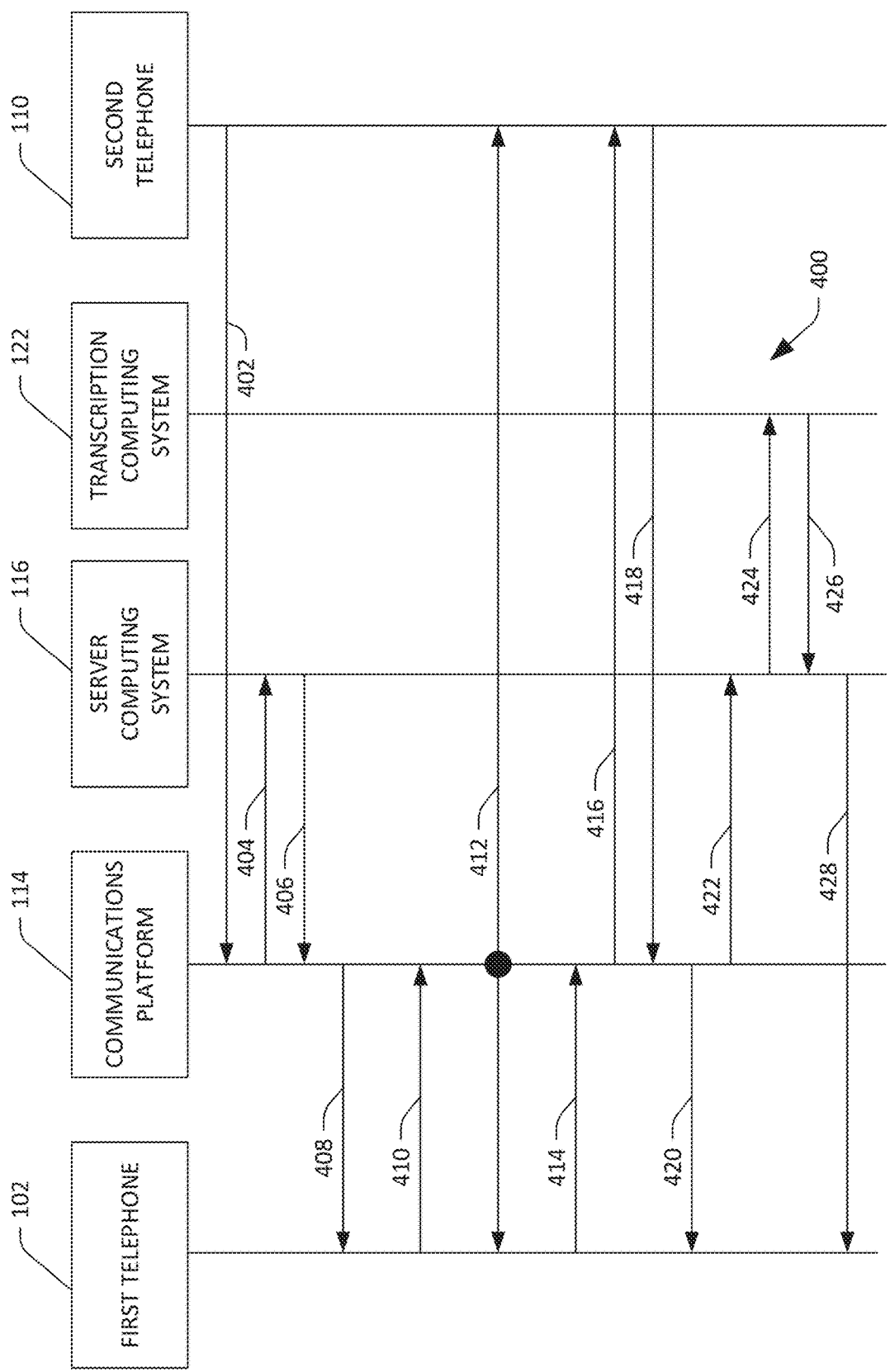
FIG. 4 is a communications diagram that illustrates exemplary communications between a first telephone, a second telephone, a communications platform, a server computing system, and a transcription computing system when a call is placed from the second telephone to the first telephone.

FIGS. 2-4 depict communications diagrams that illustrate exemplary methodologies relating to technologies that are well-suited for use by a person with a hearing impairment. While the methodologies are described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 2, a communications diagram 200 that depicts exemplary communications between the first telephone 102, the server computing system 116, and the communications platform 114 with respect to the first telephone 102 acquiring a token from the communications platform 114 is illustrated. At 202, the first telephone 102 transmits a request for a token to the server computing system 116, wherein the token is usable by the first telephone 102 to authenticate with the communications platform 114 (e.g., in order to obtain access to communications services provided by the communications platform 114). In an example, the first telephone 102 can transmit the request for the token to the server computing system 116 upon the first telephone 102 being started for the first time. In another example, the first telephone 102 can transmit the request for the token to the server computing system 116 upon an application installed on the first telephone 102 being executed for the first time (e.g. a telephone application).

The server computing system 116, in response to receiving the request for the token from the first telephone 102, can assign a telephone number to the first telephone 102. For example, the server computing system 116 can maintain a list of telephone numbers that can be assigned to telephones that transmit requests for tokens to the server computing system 116. In another example, the user 104 of the first telephone 102 may already have a telephone number that is to be transferred to the first telephone 102 and can provide the server computing system 116 with such telephone number when registering with the server computing system 116.

At 204, in response to receiving the request for the token from the first telephone 102, the server computing system 116 transmits a token request to the communications platform 114. The token request includes the telephone number that is assigned to the first telephone 102 and credentials for the server computing system 116. For example, the server computing system 116 may have an account with the communications platform 114 and can provide an account key to the communications platform 114.

The communications platform 114, upon receiving the request from the server computing system 116, can assign a unique device identifier to the first telephone 102 (different from the telephone number) and can generate a token based upon the credentials of the server computing system 116 and the unique device identifier. The token is unique to the first telephone 102 and is usable by the first telephone 102 to gain access to the communications services offered by the communications platform 114. The communications platform maps the telephone number of the first telephone 102 to the unique device identifier assigned to the first telephone 102.

At 206, the communications platform 114 transmits the token for the first telephone 102 to the server computing system 116 and additionally transmits the unique device identifier for the first telephone 102 to the server computing system 116. The server computing system 116 can retain the device identifier and can also map the telephone number that is assigned to the first telephone 102 to the device identifier.

At 208, the server computing system 116 transmits the token to the first telephone 102. Subsequently, when the first telephone 102 initiates a call or when another telephone initiates a call with the first telephone, the first telephone 102 can transmit the token to the communications platform 114 to authenticate to the communications platform 114 and gain access to the communications services offered by the communications platform 114.

Now referring to FIG. 3, an exemplary communications diagram 300 depicting communications undertaken between and amongst the first telephone 102, the communications platform 114, the server computing system 116, the transcription computing system 122, and the second telephone 110 is illustrated. In the exemplary communications diagram 300, the first user 104 of the first telephone 102 employs the first telephone 102 to place a phone call to the second telephone 110. For example, the first user 104 of the first telephone 102 can employ a dial pad to dial a telephone number assigned to the second telephone 110. In another example, the first telephone 102 can receive a selection of the second user 112 from a list of contacts and can initiate the telephone call in response to receiving such selection.

At 302, the first telephone 102 generates a call request and transmits the call request to the communications platform 114. The call request can include the telephone number of the second telephone 110 and the token previously provided to the first telephone 102.

Upon receiving the call request, the communications platform 114 can ascertain that the token was generated based upon the credentials of the server computing system 116, and therefore can ascertain that a device to which the device identifier is assigned (e.g., the first telephone 102) corresponds to the server computing system 116. At 304, upon the communications platform 114 ascertaining that the first telephone 102 is assigned to the server computing system 116, the communications platform 114 can transmit an outbound call notification to the server computing system 116, which indicates that the first telephone 102 is attempting to make an outbound call. The communications platform 114 refrains from performing any further action until the server computing system 116 responds to the outbound call notification.

The server computing system 116, in response to receiving the outbound call notification from the communications platform 114 and at 306, transmits instructions to the communications platform, wherein the instructions comprise: 1) an instruction to connect the call to the dialed telephone number; and 2) an instruction to stream a voice signal output by the telephone associated with the dialed telephone number (e.g., the second telephone 110) to the server computing system 116. The instructions can further indicate that a second voice signal output by the telephone that dialed the number is not to be streamed to the server computing system 116.

At 308, the communications platform 114 connects the call between the first telephone 102 and the second telephone 110 such that a bidirectional telephone session is established between the first telephone 102 and the second telephone 110. The bidirectional telephone session includes a first voice channel from the first telephone 102 to the second telephone 110 and a second voice channel from the second telephone 110 to the first telephone 102. The first voice channel carries a first voice signal that includes first spoken utterances set forth by the first user 104 while the second voice channel includes a second voice signal that comprises second spoken utterances set forth by the second user 112.

At 310 the first telephone 102 outputs the first voice signal on the first voice channel and at 312 the communications platform 114 routes the first voice signal to the second telephone 110. At 314 the second telephone 110 outputs a second voice signal on the second voice channel, and at 316 the communications platform 114 routes the second voice signal to the first telephone 102.

At 318, upon the communications platform 114 receiving the second voice signal output by the second telephone 110, the communications platform 114 streams the second voice signal to the server computing system 116 (per the instructions provided to the communications platform 114 at 304). At 320, the server computing system 116 forwards the second voice signal to the transcription computing system 122. As indicated previously, the second voice signal includes second voice utterances of the second user 112 of the second telephone 110.

The transcription computing system 122 generates transcriptions of the second spoken utterances in real-time or near real-time, and at 322 transmits data to the server computing system 116. The data includes the transcriptions of the second spoken utterances and metadata assigned to such transcriptions. The metadata can comprise timestamps that are assigned to words in the transcriptions and other metadata such as a status of a transcribed word (e.g., where the status indicates whether or not the ASR system 124 may subsequently change the word based upon subsequently received words), etc.

The server computing system 116, upon receiving the data from the transcription computing system 122, filters the timestamps and other metadata from the data, leaving the transcriptions of the second spoken utterances. At 324, the server computing system 116 transmits the transcription of the second spoken utterances to the first telephone 102, whereupon the first telephone 102 displays the transcriptions on the display 106 thereof. It is to be noted that the transcriptions of the second spoken utterances are received by the first telephone 102 at approximately the same time that the first telephone 102 receives the second voice signal at 316. Therefore, the first user 104 of the first telephone 102 can read the second spoken utterances nearly simultaneously with being audibly provided with the second spoken utterances.

When the call between the first telephone 102 and the second telephone 110 is ended, the communications platform 114 can close the session between the telephones 102 and 110, and can further transmit data that is indicative of an amount of time of the session to the server computing system 116. Upon receiving the indication that the session is closed, the server computing system 116 can transmit an indication to the transcription computing system 122 that the session between the server computing system 116 and the transcription computing system 122 is to be closed, whereupon the transcription computing system 122 can transmit data that is indicative of an amount of time of the session to the server computing system 116. The server computing system 116 can associate the time data received from the communications platform 114 and the transcription computing system 122 with an account of a user of the first telephone 102.

With reference to FIG. 4, a communications diagram 400 that depicts communications amongst and between the first telephone 102, the communications platform 114, the server computing system 116, the transcription computing system 122, and the second telephone 110 when the second telephone 110 places a call to the first telephone 102 is illustrated. The second user 112 of the second telephone 110 causes the second telephone 110 to place a call to the first telephone 102 by, for example, setting forth the telephone number of the first telephone 102 to the second telephone 110 (e.g., through use of a dial pad, by selecting a contact in a contact list, etc.). At 402, the second telephone 110 outputs a call request, wherein the call request includes the telephone number assigned to the first telephone 102, and the call request is provided to the communications platform 114 (since the telephone number is assigned to the communications platform). The communications platform 114, upon receiving the call request, can identify the unique device identifier assigned to the telephone number in the call request, and can further ascertain that the unique device identifier corresponds to a device associated with the server computing system 116. Upon identifying the server computing system 116, the communications platform, at 404, transmits an incoming call notification to the server computing system 116. The incoming call notification includes the unique device identifier assigned to the first telephone 102. At 406, the server computing system 116, upon receiving the incoming call notification, transmits instructions to the communications platform 114, wherein the instructions include: 1) an instruction to connect the call to the first telephone 102; and 2) an instruction for the communications platform 114 to stream a voice signal output by the second telephone 110 (to the first telephone 102) to the server computing system 116.

Upon receiving such instructions, the communications platform 114 ascertains whether the first telephone 102 is currently in an active session with the communications platform 114. If the communications platform 114 ascertains that the first telephone 102 is not currently in an active session with the communications platform 114, at 408 the communications platform 114 transmits a wake-up signal to the first telephone. At 410, upon receiving the wake-up signal, the first telephone 102 wakes up and transmits its token to the communications platform 114. When the first telephone 102 is already awake and in an active session with the communications platform 114, the communications platform 114 need not receive the token from the first telephone 102.

At 412, the communications platform 114 connects the call between the first telephone 102 and the second telephone 110 such that a bidirectional communications session is established, wherein such bidirectional communications session includes a first voice channel from the first telephone 102 to the second telephone 110 and a second voice channel from the second telephone 110 to the first telephone 102. The first voice channel carries a first voice signal that includes first spoken utterances set forth by the first user 104 of the first telephone 102 while the second voice channel carries a second voice signal that comprises second spoken utterances set forth by the second user 112 of the second telephone 110.

At 414, the first telephone 102 outputs a first voice signal and at 416 the communications platform 114 routes the first voice signal to the second telephone 110. At 418 the second telephone 110 outputs a second voice signal and at 420 the communications platform 414 routes the second voice signal to the first telephone 102. At 422, per the instructions received from the server computing system 116 at 406, the communications platform 114 streams the second voice signal to the server computing system 116. At 424, the server computing system 116, upon receiving the second voice signal, forwards the second voice signal to the transcription computing system 122. The transcription computing system 122 generates data (where the data includes transcriptions of the second spoken utterances in the second voice signal and metadata corresponding thereto), and at 426 the data is transmitted to the server computing system 116.

The server computing system 116 receives the data output by the transcription computing system 122, filters extraneous metadata therefrom (as described above), and at 428 transmits transcriptions of the second spoken utterances in the second voice signal to the first telephone 102. The first telephone 102, upon receipt of the transcriptions, displays the transcriptions on the display 106 of the first telephone 102, wherein such transcriptions are displayed to the first user 104 nearly simultaneously with the second spoken utterances being audibly output to the first user 104.

When the call between the first telephone 102 and the second telephone 110 is ended, the communications platform 114 can close the session between the telephones 102 and 110, and can further transmit data that is indicative of an amount of time of the session to the server computing system 116. Upon receiving the indication that the session is closed, the server computing system 116 can transmit an indication to the transcription computing system 122 that the session between the server computing system 116 and the transcription computing system 122 is to be closed, whereupon the transcription computing system 122 can transmit data that is indicative of an amount of time of the session to the server computing system 116. The server computing system 116 can associate the time data received from the communications platform 114 and the transcription computing system 122 with an account of a user of the first telephone 102.

Figure 5:
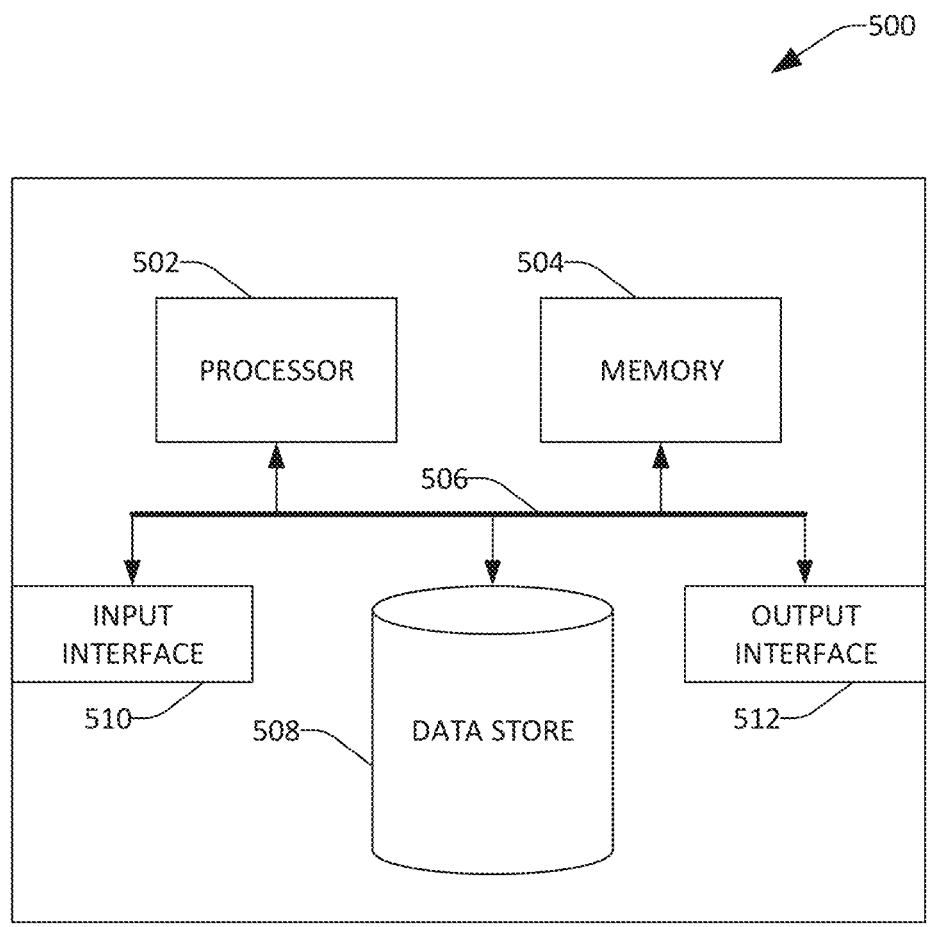
FIG. 5 depicts an exemplary computing system.

Referring now to FIG. 5, a high-level illustration of an exemplary computing device 500 that can be used in accordance with the systems and methodologies disclosed herein is illustrated. For instance, the computing device 500 may be used in a system that is configured to display transcriptions on a display simultaneously with audibly emitting spoken utterances that correspond to such transcriptions. By way of another example, the computing device 500 can be used in a system that is configured to generate transcriptions of spoken utterances. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store transcriptions, voice signals, voice profiles, identities of contacts of a person, etc.

The computing device 500 additionally includes a data store 508 that is accessible by the processor 502 by way of the system bus 506. The data store 508 may include executable instructions, transcriptions, voice signals, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A server computing system that is in network communication with a communications platform, the server computing system comprising:
    a processor; and
    memory storing instructions that, when executed by the processor, cause the processor to perform acts comprising:
        receiving a request for a token from a first telephone, wherein the token is usable by the first telephone to authenticate with the communications platform;
        in response to receiving the request, transmitting credentials of the server computing system to the communications platform, wherein the token is generated by the communications platform based upon the credentials of the server computing system;
        receiving the token from the communications platform;
        in response to receiving the token from the communications platform, transmitting the token to the first telephone;
        subsequent to transmitting the token to the first telephone, receiving, from the communications platform, an incoming call notification for a first telephone, the incoming call notification indicates that a second telephone is being employed to place a call to the first telephone;
        in response to receiving the incoming call notification, transmitting instructions to the communications platform, the instructions informing the communications platform to:
            connect the call from the second telephone to the first telephone; and
            when the call is connected, cause a voice signal output by the second telephone to be streamed to the server computing system, wherein the voice signal is directed to the first telephone;
        upon the call being connected, receiving the voice signal and forwarding the voice signal to a transcription computing system, wherein the transcription computing system transcribes spoken utterances in the voice signal;
        receiving data from the transcription computing system, the data comprises transcriptions of the spoken utterances in the voice signal; and
        forwarding the transcriptions of the spoken utterances to the first telephone for display on a display of the first telephone during the call between the first telephone and the second telephone.

2. The server computing system of claim 1, wherein the transcriptions of the spoken utterances are forwarded to the first telephone in real time such that the first telephone displays the spoken utterances on the display within ½ second of when the spoken utterances are audibly output by the first telephone.

3. The server computing system of claim 1, wherein the communications platform is a cloud-based communications platform.

4. The server computing system of claim 1, wherein the data comprises timestamps that are assigned to words in the transcriptions of the spoken utterances, the acts further comprising filtering the timestamps from the data prior to forwarding the transcriptions of the spoken utterances to the first telephone.

5. The server computing system of claim 1, wherein the data comprises metadata that indicates that a transcription of a word in the spoken utterances is in a finalized form, the acts further comprising filtering the metadata from the data prior to forwarding the transcriptions of the spoken utterances to the first telephone.

6. The server computing system of claim 1, wherein the communications platform supports the Voice Over Internet Protocol.

7. The server computing system of claim 1, wherein the instructions further indicate that a second voice signal output by the first telephone that is directed to the second telephone is not to be streamed to the server computing system.

8. The server computing system of claim 1, the acts further comprising:

receiving, from the communications platform, an indication that the call between the first telephone and the second telephone has ended; and upon receiving the indication, closing a session between the server computing system and the transcription computing system.

9. The server computing system of claim 8, the acts further comprising:

receiving, from the transcription computing system, an amount of time of the session between the server computing system and the transcription computing system; and assigning the amount of time to an account assigned to the first telephone.

10. A method performed by a server computing system that is in network communication with a communications platform, the method comprising:

receiving, from a first telephone, a request for a token that is usable by the first telephone to authenticate with the communications platform;

in response to receiving the request, transmitting credentials of the server computing system to the communications platform, wherein the token is generated by the communications platform based upon the credentials of the server computing system;

receiving the token from the communications platform;

in response to receiving the token from the communications platform, transmitting the token to the first telephone;

subsequent to transmitting the token to the first telephone, receiving, from the communications platform, an incoming call notification for the first telephone, the incoming call notification indicates that a second telephone is being employed to place a call to the first telephone;

in response to receiving the incoming call notification, transmitting instructions to the communications platform, the instructions informing the communications platform to:

connect the call from the second telephone to the first telephone; and when the call is connected, cause a voice signal output by the second telephone to be streamed to the server computing system, wherein the voice signal is directed to the first telephone;

upon the call being connected, receiving the voice signal and forwarding the voice signal to a transcription computing system, wherein the transcription computing system transcribes spoken utterances in the voice signal;

receiving data from the transcription computing system, the data comprises transcriptions of the spoken utterances in the voice signal; and forwarding the transcriptions of the spoken utterances to the first telephone for display on a display of the first telephone during the call between the first telephone and the second telephone.

11. The method of claim 10, wherein the transcriptions of the spoken utterances are forwarded to the first telephone in such that the first telephone displays the spoken utterances on the display within ½ second of when the spoken utterances are audibly output by the first telephone.

12. The method of claim 10, wherein the communications platform is a cloud-based communications platform.

13. The method of claim 10, wherein the data comprises timestamps that are assigned to words in the transcriptions of the spoken utterances, the method further comprising filtering the timestamps from the data prior to forwarding the transcriptions of the spoken utterances to the first telephone.

14. The method of claim 10, wherein the data comprises metadata that indicates that a transcription of a word in the spoken utterances is in a finalized form, the method further comprising filtering the metadata from the data prior to forwarding the transcriptions of the spoken utterances to the first telephone.

15. The method of claim 10, wherein the communications platform supports the Voice Over Internet Protocol.

16. The method of claim 10, wherein the instructions further indicate that a second voice signal output by the first telephone that is directed to the second telephone is not to be streamed to the server computing system.

17. The method of claim 10, the acts further comprising:

receiving, from the communications platform, an indication that the call between the first telephone and the second telephone has ended; and upon receiving the indication, closing a session between the server computing system and the transcription computing system.

18. A computer-readable storage medium of a server computing system that is in network communication with a communications platform, the computer-readable storage medium comprising instructions that, when executed by a processor of the server computing system, cause the processor to perform acts comprising:

receiving, from a first telephone, a request for a token that is usable by the first telephone to authenticate with the communications platform;

in response to receiving the request, transmitting credentials of the server computing system to the communications platform, wherein the token is generated by the communications platform based upon the credentials of the server computing system;

receiving the token from the communications platform;

in response to receiving the token from the communications platform, transmitting the token to the first telephone;

subsequent to transmitting the token to the first telephone, receiving, from the communications platform, an incoming call notification for the first telephone, the incoming call notification indicates that a second telephone is being employed to place a call to the first telephone;

in response to receiving the incoming call notification, transmitting instructions to the communications platform, the instructions informing the communications platform to:

connect the call from the second telephone to the first telephone; and when the call is connected, cause a voice signal output by the second telephone to be streamed to the server computing system, wherein the voice signal is directed to the first telephone;

upon the call being connected, receiving the voice signal and forwarding the voice signal to a transcription computing system, wherein the transcription computing system transcribes spoken utterances in the voice signal;

receiving data from the transcription computing system, the data comprises transcriptions of the spoken utterances in the voice signal; and forwarding the transcriptions of the spoken utterances to the first telephone for display on a display of the first telephone during the call between the first telephone and the second telephone.

19. The computer-readable storage medium of claim 18, wherein the transcriptions of the spoken utterances are forwarded to the first telephone in real time such that the first telephone displays the spoken utterances on the display within ½ second of when the spoken utterances are audibly output by the first telephone.

20. The computer-readable storage medium of claim 18, wherein the data comprises timestamps that are assigned to words in the transcriptions of the spoken utterances, the acts further comprising filtering the timestamps from the data prior to forwarding the transcriptions of the spoken utterances to the first telephone.

\* \* \* \* \*